US012689272B2

(12) United States Patent (10) Patent No.: US 12,689,272 B2
Fujino (45) Date of Patent: Jul. 21, 2026

(54) CONTROL SYSTEM

(71) Applicant: ISUZU MOTORS LIMITED,
Yokohama (JP)

(72) Inventor: Ryusuke Fujino, Fujisawa (JP)

(73) Assignee: ISUZU MOTORS LIMITED,
Yokohama (JP)

( * ) Notice: Subject to any disclaimer, the term of this
patent is extended or adjusted under 35
U.S.C. 154(b) by 177 days.

(21) Appl. No.: 18/589,507

(22) Filed: Feb. 28, 2024

(65) Prior Publication Data

US 2024/0305179 A1 Sep. 12, 2024

(30) Foreign Application Priority Data

Mar. 9, 2023 (JP) .................................. 2023-036274

(51) Int. Cl.
H02K 21/02 (2006.01)
B60K 6/26 (2007.10)
(52) U.S. Cl.
CPC .............. H02K 21/024 (2013.01); B60K 6/26
(2013.01); B60Y 2200/92 (2013.01); B60Y
2400/60 (2013.01)
(58) Field of Classification Search
CPC .... H02K 21/12; H02K 7/1838; H02K 21/024;
F03D 7/028; F03D 9/25; F03D 7/0272
See application file for complete search history.

(56) References Cited

U.S. PATENT DOCUMENTS

| | | | |
|---|---|---|---|
| 5,675,203 A | 10/1997 | Schulze et al. | |
| 5,899,286 A | 5/1999 | Yamaguchi | |
| 6,429,611 B1 * | 8/2002 | Li | H02K 21/14 |
| | | | 310/20 |
| 7,863,789 B2 * | 1/2011 | Zepp | H02K 21/024 |
| | | | 310/90 |
| 2002/0130562 A1 | 9/2002 | Tamura et al. | |
| 2020/0106338 A1 | 4/2020 | Ishida | |
| 2020/0164422 A1 | 5/2020 | Lundquist | |
| 2023/0216388 A1 | 7/2023 | Kuhl et al. | |

FOREIGN PATENT DOCUMENTS

| | | |
|---|---|---|
| DE | 4408719 C1 | 7/1995 |
| DE | 19960168 A1 | 6/2001 |
| DE | 102015120482 A1 | 6/2016 |
| DE | 102015200166 A1 | 7/2016 |
| DE | 102020114856 B3 | 9/2021 |
| JP | H08-207601 A | 8/1996 |
| JP | H09098558 A | 4/1997 |
| JP | 2003-88082 A | 3/2003 |
| JP | 2008143439 A | 6/2008 |
| JP | 2008259364 A | 10/2008 |
| JP | 2010-154699 A | 7/2010 |
| JP | 2020-058145 A | 4/2020 |
| WO | WO-2009004633 A2 * | 1/2009 ............... H02K 3/28 |

* cited by examiner

*Primary Examiner* — Leda T Pham
(74) *Attorney, Agent, or Firm* — Shih IP Law Group,
PLLC

(57) ABSTRACT

A control system includes: a motor including (i) a rotor,
connected to an output shaft of an engine, and (ii) a stator
that is movable in an axial direction of the rotor, a moving
member connected to the stator, a coil wound around the
moving member, and a movement control part that changes
an overlap amount of the rotor and the stator in the axial
direction, by moving the stator in the axial direction of the
rotor by causing a power source to apply a voltage to the
coil.

11 Claims, 6 Drawing Sheets

CONTROL SYSTEM

CROSS-REFERENCE TO RELATED APPLICATIONS

The present application claims priority to Japanese Patent Applications number 2023-36274, filed on Mar. 9, 2023, contents of which are incorporated herein by reference in their entirety.

BACKGROUND OF THE INVENTION

The present disclosure relates to a control system that controls a motor. Hybrid vehicles equipped with a plurality of power sources are known. Japanese Unexamined Patent Application Publication No. H8-207601 discloses a hybrid vehicle in which an engine and a motor connected to an output shaft of the engine are mounted as power sources.

When the output shaft rotates in a state where electric power is not supplied to a motor connected to the output shaft of the engine, the motor functions as a generator. As a result, the motor, functioning as the generator, impedes the rotation of the output shaft of the engine, causing the loss of driving force of the engine.

BRIEF SUMMARY OF THE INVENTION

The present disclosure focuses on this point, and its object is to reduce the loss of driving force of an engine.

An aspect of the present disclosure provides a control system including: a motor includes a rotor connected to an output shaft of an engine, and a stator that generates a magnetic field for rotating the rotor; and a movement control part that changes an overlap amount of the stator and the rotor in the axial direction, by moving the stator in an axial direction of the rotor.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

[Configuration of a Control System S According to a First Embodiment]

Figure 1:
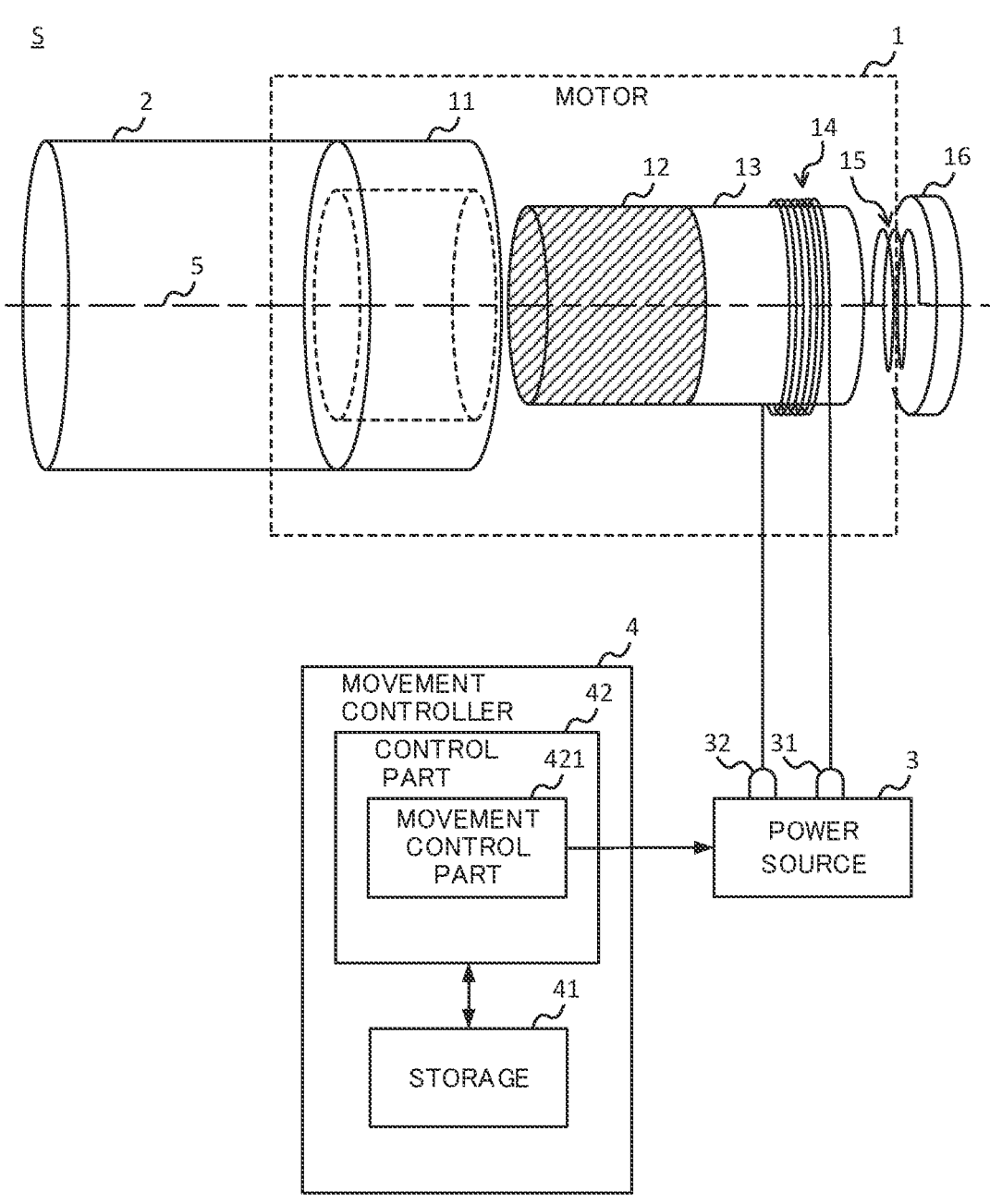
FIG. 1 is a diagram illustrating a configuration of a control system according to a first embodiment.

FIG. 1 is a diagram illustrating a configuration of a control system S according to a first embodiment. The control system S is mounted in a vehicle including an engine and a motor 1 connected to an output shaft 2 of the engine. The control system S includes the motor 1, a power source 3, and a movement controller 4.

The motor 1 is an outer-rotor type motor in which a rotor 11 disposed outside a stator 12 rotates. The rotor 11 is connected to the output shaft 2. The rotor 11 has a cylindrical shape. The rotor 11 rotates about a rotation axis 5. The stator 12 is provided such that it can move in an axial direction of the rotor 11. The stator 12 has a cylindrical shape. The stator 12 is provided with a coil that generates a magnetic field for rotating the rotor 11. By having the rotor 11 rotate, it becomes possible for the motor 1 to supplement a driving force with which the engine rotates the output shaft 2. On the other hand, in a case where the output shaft 2 is to be rotated solely by the engine, the motor 1 stops its rotation. The driving of the motor 1 is controlled by controlling a current flowing through the coil provided in the stator 12.

A moving member 13 is provided opposite to the rotor 11 in the axial direction when viewed from the stator 12. The moving member 13 is a pipe, and it may have a cylindrical shape. The moving member 13 is connected to the stator 12 and movable in the axial direction together with the stator 12. A coil 14 is spirally wound around the moving member 13. The coil 14 is an insulated electric wire in which a conductor is covered with an insulator, for example, and is a solenoid coil.

An elastic member 15 that applies a force to the stator 12 in the axial direction is connected to the moving member 13. The elastic member 15 is provided opposite to the stator 12 in the axial direction when viewed from the moving member 13. The elastic member 15 is connected to (i) a first holding member 16, which holds the elastic member 15, and (ii) the moving member 13. The elastic member 15 applies a force in a direction (a direction from the left to the right in the drawing) in which the stator 12 is pulled out from the rotor 11 in the axial direction. For example, the elastic member 15 is a tension spring, but is not limited thereto.

The elastic member 15 applies a force to the stator 12 in a direction in which the stator 12 moves away from the rotor 11 in the axial direction. In other words, the elastic member 15 pulls out the stator 12 from the rotor 11 by applying a force to the moving member 13 in a direction in which the stator 12 and the moving member 13 are pulled toward the first holding member 16, thereby reducing an overlap amount of the rotor 11 and the stator 12 in the axial direction. More specifically, the elastic member 15 applies the force to the stator 12 and the moving member 13 in the direction in which the stator 12 and the moving member 13 are pulled toward the first holding member 16 in the axial direction, and makes the overlap amount equal to or less than a threshold value.

The threshold value is represented by a ratio (percentage) of the length of a portion of the stator 12 overlapping with the rotor 11 to the length of the rotor 11 in the axial direction. The threshold value may be represented as a ratio of the length of a portion of the rotor 11 overlapping with the stator 12 to the length of the stator 12 in the axial direction. As will be described later, the threshold value is set as a value that can sufficiently suppress the amount of electric power generated by the motor 1 when it functions as the generator through the rotation of the output shaft in the case where the motor is not driven. In other words, in a case where the overlap amount is equal to or less than the threshold value, the motor 1 does not function as the generator, and does not generate electric power even when the rotor 11 rotates. The threshold value is 10%, for example. The threshold value may be 0% so that the motor 1 does not function as the generator. In the present embodiment, the threshold value is 0%. The setting of the threshold value is not limited thereto.

The power source 3 applies a voltage to the coil 14. The power source 3 can supply a current to the coil 14 by applying the voltage to the coil 14. For example, the power source 3 applies to the coil 14 a voltage by which a first terminal 31 becomes the positive electrode (+) and a second terminal 32 becomes the negative electrode (−). By inverting the polarity of the voltage, the power source 3 can also apply a voltage to the coil 14 by which the first terminal 31 becomes the negative electrode (−) and the second terminal 32 becomes the positive electrode (+).

The movement controller 4 includes a storage 41 and a control part 42. The storage 41 includes storage media such as a ROM (Read Only Memory), a RAM (Random Access Memory), a hard disk, and the like. The storage 41 stores a program executed by the control part 42.

The control part 42 is a calculation resource including a processor such as a CPU (Central Processing Unit). By executing the program stored in the storage 41, the control part 42 functions as the movement control part 421. The control part 42 may be configured with one or more processors, or may be configured with a combination of one or more processors and one or more electronic circuits.

The movement control part 421 changes the overlap amount of the stator 12 and the rotor 11 in the axial direction of the rotor 11 by moving the stator 12 in the axial direction of the rotor 11. For example, the movement control part 421 moves the stator 12 in the axial direction of the rotor 11 such that the overlap amount in a case where the motor 1 is not driven becomes smaller than the overlap amount in a case where the motor 1 is driven. By doing this, the movement control part 421 can prevent the motor 1 from generating electric power when the motor 1 is not driven.

The movement control part 421 moves the stator 12 in the axial direction of the rotor 11 by causing the power source 3 to apply a voltage to the coil 14, thereby changing the overlap amount. Specifically, the movement control part 421 causes the power source 3 to apply, to the coil 14, a voltage by which the first terminal 31 becomes the positive electrode (+) and the second terminal 32 becomes the negative electrode (−), thereby causing a force, which is greater than the force applied to the stator 12 by the elastic member 15, to be applied to the stator 12. More specifically, by causing the stator 12 to generate a Lorentz force, which is greater than the force applied to the stator 12 by the elastic member 15, the movement control part 421 moves the stator 12 in a direction (a direction from the right to the left in the drawing) in which the stator 12 approaches the rotor 11, and increases the overlap amount. The movement control part 421 continues to apply the voltage until the overlap amount becomes the maximum (100%).

When moving the stator 12, the movement control part 421 may turn the moving member 13 into an electromagnet. In this case, the first holding member 16 is formed of permanent magnets, and the moving member 13 is formed of magnetic materials other than a magnet. The magnetic material is iron, for example, but is not limited thereto. By causing the power source 3 to apply the voltage to the coil 14, the movement control part 421 turns the moving member 13 into an electromagnet. Specifically, by causing the power source 3 to apply the voltage to the coil 14, the movement control part 421 turns the moving member 13 into a magnet that generates a magnetic repulsion force by which the moving member 13 is repelled from the first holding member 16. By doing this, the coil 14 and the moving member 13 function as solenoid actuators. Since the movement control part 421 turns the moving member 13 into an electromagnet, the stator 12 moves in a direction away from the first holding member 16 and approaching the rotor 11. As a result, the overlap amount of the rotor 11 and the stator 12 increases.

Figure 2:
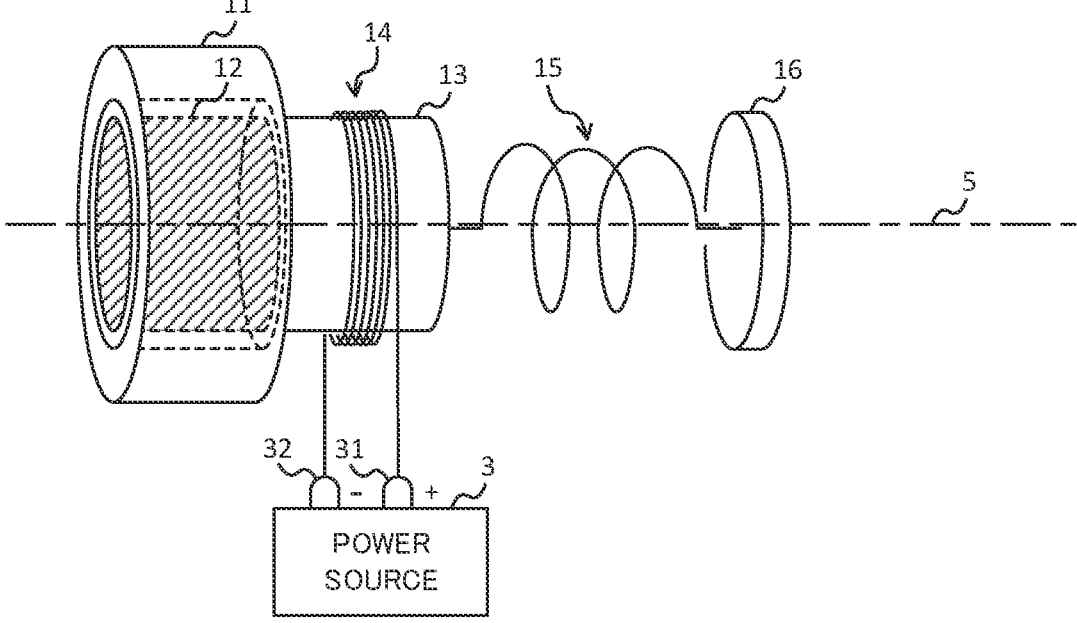
FIG. 2 is a schematic view of the control system when an overlap amount is maximized.

FIG. 2 is a schematic view of the control system S when the overlap amount is maximized. In a case where the motor 1 supplements the driving force of the engine, the movement control part 421 causes the power source 3 to continue to apply, to the coil 14, the voltage by which the first terminal 31 becomes the positive electrode and the second terminal 32 becomes the negative electrode. In other words, while the motor 1 supplements the driving force of the engine, the movement control part 421 maintains the maximized state of the overlap amount, by causing the power source 3 to continuously apply, to the coil 14, the voltage by which the first terminal 31 becomes positive and the second terminal 32 becomes negative.

In a case where the motor 1 is not used since supplementing the driving force of the engine is not necessary, the movement control part 421 causes the power source 3 not to apply any voltage to the coil 14. In a case where the power source 3 does not apply any voltage to the coil 14, the stator 12 and the moving member 13 are pulled toward the first holding member 16 by the force from the elastic member 15. In other words, the elastic member 15 pulls out the stator 12 from the rotor 11 by applying, to the moving member 13, a force in a direction in which the stator 12 and the moving member 13 are pulled toward the first holding member 16, thereby reducing the overlap amount of the rotor 11 and the stator 12 in the axial direction. More specifically, the elastic member 15 pulls out the stator 12 from the rotor 11 and makes the overlap amount equal to or less than the threshold value.

When the overlap amount of the rotor 11 and the stator 12 decreases to be equal to or less than the threshold value due to the elastic member 15 applying the force to the stator 12 and the moving member 13, the function of the motor 1 as a generator is suppressed. As a result, even when the rotor 11 rotates through the rotation of the output shaft 2, the motor 1 ceases to generate electric power. In a case where the motor 1 does not generate electric power, the motor 1 does not impede the rotation of the output shaft 2, and therefore the moving member 13 can reduce the loss of the driving force of the engine.

In this manner, the movement control part 421 changes the overlap amount of the rotor 11 and the stator 12 by causing the power source 3 to switch between whether or not to apply the voltage to the coil 14. By doing this, the movement control part 421 can make the overlap amount when the motor 1 is not used smaller than the overlap amount when the motor 1 is used. The smaller the overlap amount, the weaker the induced electromotive force of the motor 1 that impedes the rotation of the output shaft 2 becomes. In other words, the overlap amount and the induced electromotive force are proportional to each other. Therefore, since the movement control part 421 can weaken the induced electromotive force of the motor 1 when the motor 1 is not used, the loss of the driving force of the engine can be reduced.

[Process Executed by the Movement Controller 4 According to the First Embodiment]

Figure 3:
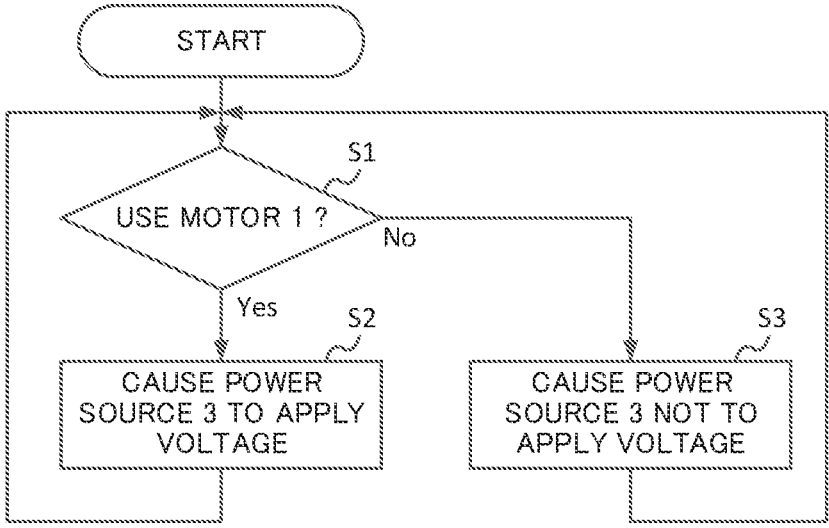
FIG. 3 is a flowchart showing an example of a process executed by a movement controller.

FIG. 3 is a flowchart showing an example of a process executed by the movement controller 4. The process shown in the flowchart of FIG. 3 is executed while a vehicle equipped with the control system S is in operation. The movement control part 421 determines whether or not to use the motor 1 (step S1). For example, when an instruction to use the motor 1 is received from an ECU (Electronic Control Unit) that controls the vehicle in which the control system S is mounted, the movement control part 421 determines that the motor 1 is to be used. When an instruction not to use the motor 1 is received from the ECU, the movement control part 421 determines that the motor 1 is not to be used.

The case where the motor 1 is used is a case where the driving force with which the engine rotates the output shaft 2 is supplemented by the output of the motor 1. The case where the motor 1 is used is a case where a vehicle equipped with the control system S including the motor 1 and the engine is traveling, for example. More specifically, the case where the motor 1 is used is a case where the vehicle is traveling uphill. On the other hand, the case where the motor 1 is not used is a case where only the output from the engine is used as the driving force to rotate the output shaft 2. The case where only the output from the engine is used is a case where fuel efficiency, which is the ratio of output power to fuel consumption when outputting the required torque only with the engine, is higher than fuel efficiency when outputting the required torque with the engine and the motor 1, for example.

When the motor 1 is used (Yes in step S1), the movement control part 421 causes the power source 3 to apply a voltage to the coil 14 (step S2). The movement control part 421 causes the power source 3 to continue to apply to the coil 14 a voltage by which the first terminal 31 becomes the positive electrode and the second terminal 32 becomes the negative electrode, during a period from receiving the instruction to use the motor 1 until receiving the instruction not to use the motor 1, to maximize (100%) the overlap amount of the rotor 11 and the stator 12. The stator 12 is kept in a state in which the overlap amount of the rotor 11 and the stator 12 is maximum (100%) while the motor 1 is used.

When the instruction not to use the motor 1 is received (No in step S1), the movement control part 421 causes the power source 3 not to apply any voltage to the coil 14 (step S3). In a case where the movement control part 421 is causing the power source 3 to apply the voltage by which the first terminal 31 become the positive electrode and the second terminal 32 becomes the negative electrode when the instruction to use the motor 1 is received, the movement control part 421 causes the power source 3 to stop the application of the voltage to the coil 14. The stator 12 moves in a direction away from the rotor 11 in the axial direction by receiving, from the elastic member 15, the force in the direction in which the stator 12 is pulled toward the first holding member 16. In other words, the stator 12 is pulled out from the rotor 11 by receiving the force from the elastic member 15. When the stator 12 is pulled out from the rotor 11, the overlap amount of the rotor 11 and the stator 12 decreases and is kept at the minimum state (0%).

[Configuration of a Control System S1 According to a Second Embodiment]

Figure 4:
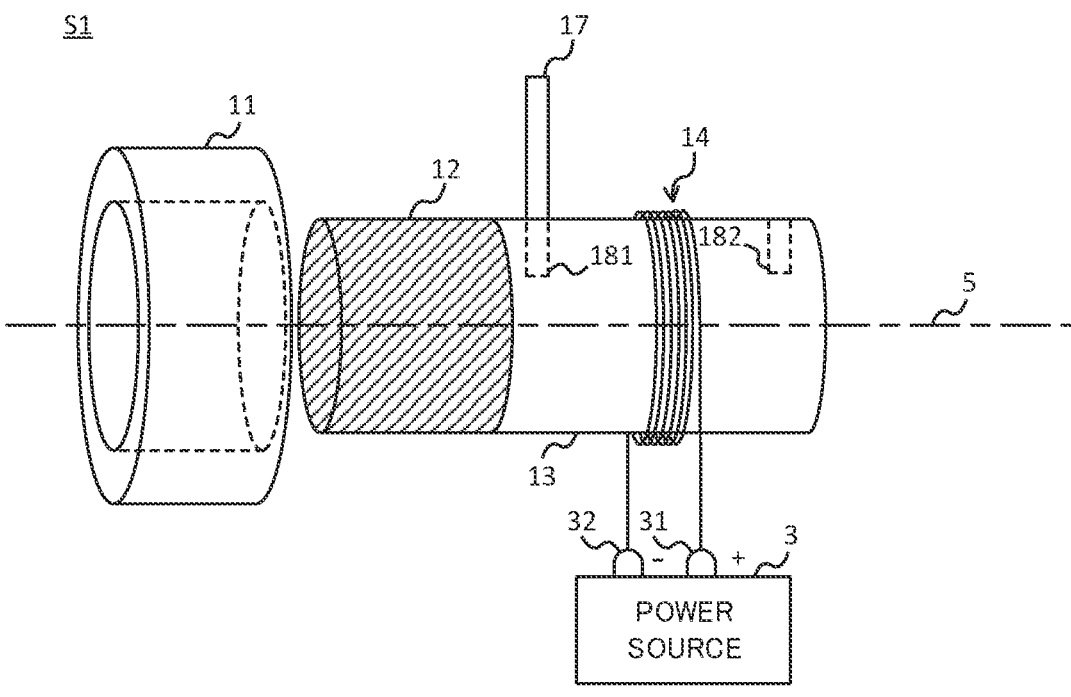
FIG. 4 is a diagram illustrating a configuration of a control system according to a second embodiment.

FIG. 4 is a diagram illustrating a configuration of a control system S1 according to a second embodiment. Unlike the control system S according to the first embodiment, the control system S1 includes a second holding member 17, instead of the elastic member 15 and the first holding member 16. Further, the moving member 13 includes a first hole 181 and a second hole 182 into which the second holding member 17 is inserted.

The second holding member 17 holds the stator 12 and the moving member 13, which assume predetermined states by being inserted into the first hole 181 or the second hole 182. The movement control part 421 controls an actuator (not shown) to move the second holding member 17 in a direction perpendicular to the rotation axis (vertical direction in the drawing), thereby pulling out the second holding member 17 from the first hole 181 or the second hole 182, or inserting the second holding member 17 into the first hole 181 or the second hole 182. The second holding member 17 is provided such that it moves in the direction perpendicular to the rotation axis and does not move in a direction parallel to the rotation axis.

The movement control part 421 inserts the second holding member 17 into the first hole 181. The second holding member 17 holds the stator 12 in a state in which the overlap amount becomes equal to or less than a first threshold value by being inserted into the first hole 181. The first threshold value is a value that can suppress the function of the motor 1 as the generator. The first threshold value is represented by a ratio (percentage) of the length of a portion of the stator 12 overlapping with the rotor 11 to the length of the rotor 11 in the axial direction. The first threshold value may be represented as a ratio of the length of a portion of the rotor 11 overlapping with the stator 12 to the length of the stator 12 in the axial direction. A specific value of the first threshold is 0%, for example. As shown in FIG. 4, by having the second holding member 17 inserted in the first hole 181, the moving member 13 and the stator 12 connected to the moving member 13 become unable to move in the axial direction. Therefore, the second holding member holds the stator 12 in a state where the overlap amount is 0%.

The movement control part 421 pulls out the second holding member 17 from the first hole 181 when increasing the overlap amount from the state in which the overlap amount is equal to or less than the first threshold value (0%). Specifically, the movement control part 421 pulls out the second holding member 17 from the first hole 181 by controlling the actuator to move the second holding member 17 inserted into the first hole 181 in the direction away from the moving member 13.

After pulling out the second holding member 17 from the first hole 181, the movement control part 421 moves the stator 12 and the moving member 13 in a direction in which the stator 12 approaches the rotor 11 in the axial direction, by causing the power source 3 to apply, to the coil 14, a first voltage by which the first terminal 31 becomes the positive electrode and the second terminal 32 becomes the negative electrode. In this way, the movement control part 421 causes the stator 12 to move in the direction approaching the rotor 11 to increase the overlap amount. When the overlap amount increases and has become equal to or greater than a second threshold value, which is greater than the first threshold value, the movement control part 421 moves the second holding member 17 in a direction approaching the moving member 13 and inserts the second holding member 17 into the second hole 182. The second threshold value is a value at which the motor 1 can exert its driving force. The second threshold value is represented by a ratio (percentage) of the length of a portion of the stator 12 overlapping the rotor 11 to the length of the rotor 11 in the axial direction. The second threshold value may be represented by a ratio of the length of a portion of the rotor 11 overlapping the stator 12 to the length of the stator 12 in the axial direction. A specific value of the second threshold is 100%, for example.

Figure 5:
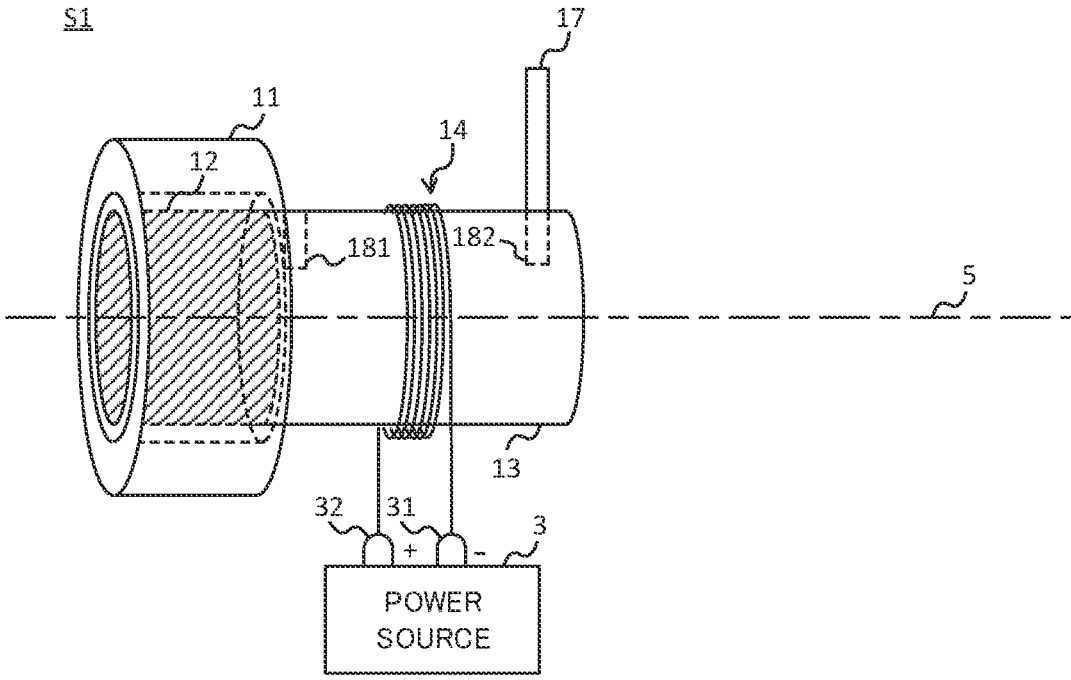
FIG. 5 is a schematic view of the control system in a state in which the overlap amount has become equal to or greater than a second threshold value.

FIG. 5 is a schematic view of the control system S1 in a state in which the overlap amount has become equal to or greater than the second threshold value. By having the second holding member inserted in the second hole 182, the moving member 13 and the stator 12 connected to the moving member 13 become unable to move in the axial direction. Therefore, the second holding member 17 holds the stator 12 in a state where the overlap amount has become equal to or greater than the second threshold value. When the second holding member 17 has been inserted into the second hole 182, the movement control part 421 causes the power source 3 to stop applying the voltage to the coil 14.

When reducing the overlap amount from the state in which the overlap amount is 100%, the movement control part 421 pulls out the second holding member 17 from the second hole 182. Specifically, the movement control part 421 pulls out the second holding member 17 from the second hole 182 by controlling the actuator to move the second holding member 17 inserted into the second hole 182 in the direction away from the moving member 13.

After pulling out the second holding member 17 from the second hole 182, the movement control part 421 causes the power source 3 to apply a second voltage having a polarity opposite to the polarity of the first voltage to the coil 14. Specifically, by causing the power source 3 to apply, to the coil 14, the second voltage by which the first terminal 31 becomes the negative electrode and the second terminal 32 becomes the positive electrode, the movement control part 421 causes the coil 14 to generate a force that moves the stator 12 in a direction in which the stator 12 is separated from the rotor 11 in the axial direction. When the second voltage is applied, the stator 12 receives the force that moves the stator 12 in the direction in which the stator 12 is separated from the rotor 11, thereby decreasing the overlap amount. The movement control part 421 controls the actuator to insert the second holding member 17 into the first hole 181 when the overlap amount decreases to 0%.

As described above, since the movement control part 421 inserts the second holding member 17 into the first hole 181, the second holding member 17 can hold the stator 12 in the state where the overlap amount is 0%. Further, since the movement control part 421 inserts the second holding member 17 into the second hole 182, the second holding member 17 can hold the stator 12 in the state where the overlap amount is 100%. Therefore, the movement control part 421 needs to operate the actuator or cause the power source 3 to apply the voltage to the coil 14 only when changing the overlap amount. As a result, the movement control part 421 does not need to continuously apply the voltage to the coil 14 in order to hold the stator 12 in the state where the overlap amount is 100% during operation of the motor 1, so that power consumption during operation of the motor 1 can be reduced.

MODIFIED EXAMPLE 1

Figure 6:
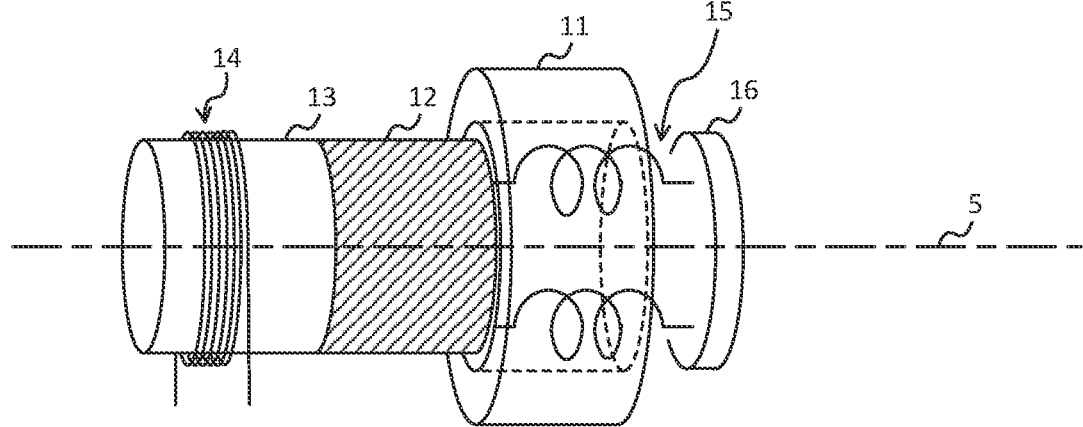
FIG. 6 is a diagram illustrating Modified Example 1.

The positional relationship among the rotor 11, the stator 12, the moving member 13, the elastic member 15, and the first holding member 16 is not limited to that shown in FIG. 1. FIG. 6 is a diagram illustrating Modified Example 1. In Modified Example 1 shown in FIG. 6, the moving member 13 is provided opposite to the rotor 11 when viewed from the stator 12 in the axial direction. The first holding member 16 is provided opposite to the moving member 13 when viewed from the stator 12 in the axial direction, and is at a position farther away than the rotor 11 when viewed from the stator 12. The elastic member 15 is connected to the stator 12 and the first holding member 16. The elastic member 15 applies a force in a direction in which the stator 12 and the moving member 13 move away from the rotor 11 (a direction from the right to the left in the drawing) in the axial direction.

MODIFIED EXAMPLE 2

Figure 7:
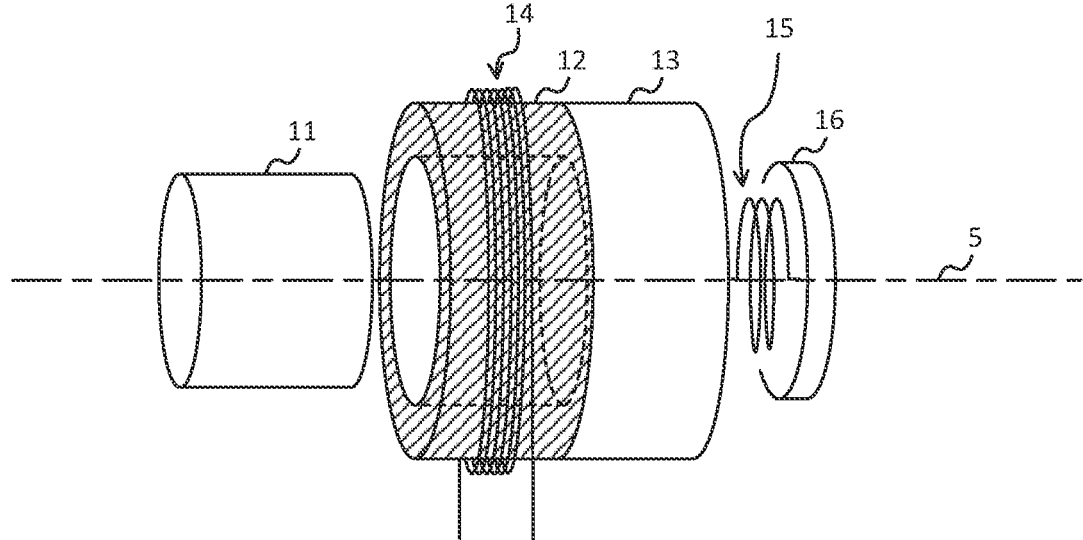
FIG. 7 is a diagram illustrating Modified Example 2.

In each of the above-described embodiments and Modified Example 1, the motor 1 is the outer-rotor type motor, but the present disclosure is not limited thereto, and the motor 1 may be an inner-rotor type motor. FIG. 7 is a diagram illustrating Modified Example 2. A control system S according to Modified Example 2 differs from the control system S according to the first embodiment of FIG. 1 in that the rotor 11 is positioned inside the stator 12, and the control system S according to Modified Example 2 is otherwise the same as the control system S according to the first embodiment. When the motor 1 is the outer-rotor type motor as shown in FIG. 7, the coil 14 may be wound around the stator 12, instead of the moving member 13, or may be wound around both the stator 12 and the moving member 13.

MODIFIED EXAMPLE 3

The movement control part 421 of the first embodiment, Modified Example 1, and Modified Example 2 cause the power source 3 to apply the voltage to the coil 14 when using the motor 1, but the present disclosure is not limited thereto. The movement control part 421 may cause the power source 3 to apply a voltage to the coil 14 when the motor 1 is not used. In this case, the movement control part 421 causes the power source 3 to apply the voltage to the coil 14 when the motor 1 is not used, thereby moving the stator 12 with a force greater than the force applied to the stator 12 by the elastic member 15, thereby reducing the overlap amount. The movement control part 421 does not cause the power source 3 to apply any voltage to the coil 14 when the motor 1 is used. When the power source 3 does not apply any voltage to the coil 14, the elastic member 15 applies a force to the stator 12 and the moving member 13, thereby increasing the overlap amount. By doing this, a control system according to Modified Example 3 can reduce power consumption and the loss of the driving force in a case where a time period during which the motor 1 is not used is shorter than a time period during which the motor 1 is used.

[Effect of the Control System S]

Since the control system S can change the overlap amount of the rotor 11 and the stator 12, it is possible to make the overlap amount when the motor 1 is not used smaller than the overlap amount when the motor 1 is used. Therefore, the control system S can weaken a force that impedes the rotation of the output shaft 2 when the motor 1 is not used, and so it can reduce the loss of the driving force of the engine.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

What is claimed is:

1. A control system comprising:

a motor includes a rotor connected to an output shaft of an engine, and a stator that generates a magnetic field for rotating the rotor;

a movement control part that changes an overlap amount of the stator and the rotor in the axial direction, by moving the stator in an axial direction of the rotor;

a moving member that is connected to the stator and movable in the axial direction together with the stator; and a coil wound around the moving member, wherein by causing a power source, that applies a voltage to the coil, to apply the voltage to the coil, the movement control part changes the overlap amount of the stator and the rotor in the axial direction by moving the stator in the axial direction.

2. The control system according to claim 1, further comprising:

an elastic member that applies a force to the stator in the axial direction, wherein the movement control part moves the stator in the axial direction with a force greater than the force applied to the stator by the elastic member, by causing the power source to apply a voltage to the coil.

3. The control system according to claim 2, wherein the elastic member reduces the overlap amount by applying a force to the stator in a direction in which the stator moves away from the rotor in the axial direction, and the movement control part moves the stator in a direction in which the stator approaches the rotor in the axial direction, by causing the power source to apply a voltage to the coil, and increases the overlap amount.

4. The control system according to claim 3, further comprising:

a first holding member that is provided opposite to the stator when viewed from the moving member in the axial direction and holds the elastic member, wherein the elastic member is connected to the moving member and the first holding member.

5. The control system according to claim 4, wherein the elastic member reduces the overlap amount by applying a force to the stator and the moving member in a direction in which the stator and the moving member are pulled toward the first holding member in the axial direction, to pull out the stator from the rotor.

6. The control system according to claim 5, wherein by causing the power source to apply a voltage to the coil, the movement control part moves the stator in a direction in which the stator approaches the rotor in the axial direction by generating a Lorentz force which is greater than the force applied to the stator by the elastic member, and increases the overlap amount.

7. The control system according to claim 5, wherein the first holding member is formed of permanent magnets, the moving member is formed of magnetic materials other than the permanent magnets, and by causing the power source to apply a voltage to the coil, the movement control part turns the moving member into an electromagnet that generates a magnetic repulsion force by which the moving member is repelled from the first holding member.

8. The control system according to claim 1, further comprising:

a second holding member that holds the stator in a state in which the overlap amount becomes equal to or less than a first threshold value at which the motor ceases to generate electric power even when the rotor rotates, and holds the stator in a state in which the overlap amount becomes equal to or greater than a second threshold value which is greater than the first threshold value.

9. The control system according to claim 1, wherein the stator is provided in the rotor to be able to move in a sliding manner, and the moving member is connected to the stator on the opposite side of the rotor across the stator.

10. The control system according to claim 1, wherein the movement control part:

causes the stator to generate a force that moves the stator in a direction in which the stator approaches the rotor in the axial direction, by causing the power source to apply a first voltage to the coil, and causes the stator to generate a force that moves the stator in a direction in which the stator moves away from the rotor in the axial direction, by causing the power source to apply a second voltage having a polarity opposite to the first voltage.

11. The control system according to claim 1, wherein the movement control part moves the stator in the axial direction such that the overlap amount of the stator and the rotor in a case where the motor is not driven becomes smaller than the overlap amount of the stator and the rotor in the axial direction in a case where the motor is driven.

* * * * *